F. P. TESSMER.
CLAMP.
APPLICATION FILED FEB. 23, 1916.
1,226,029.
Patented May 15, 1917.
Fig. 2.
Fig. 1.
Fig. 3.
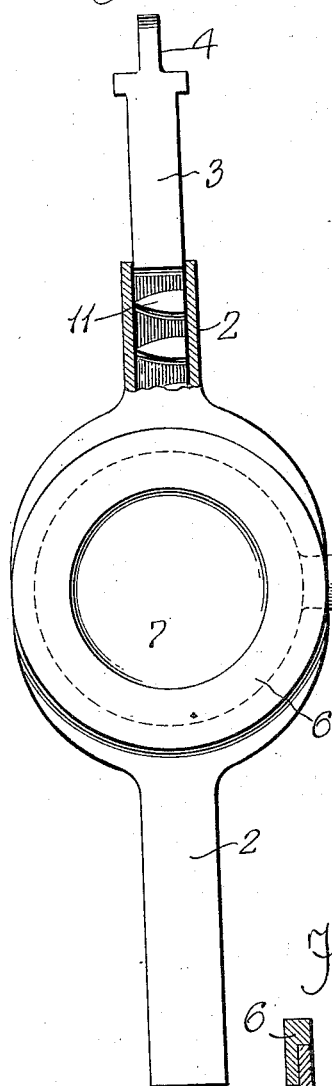
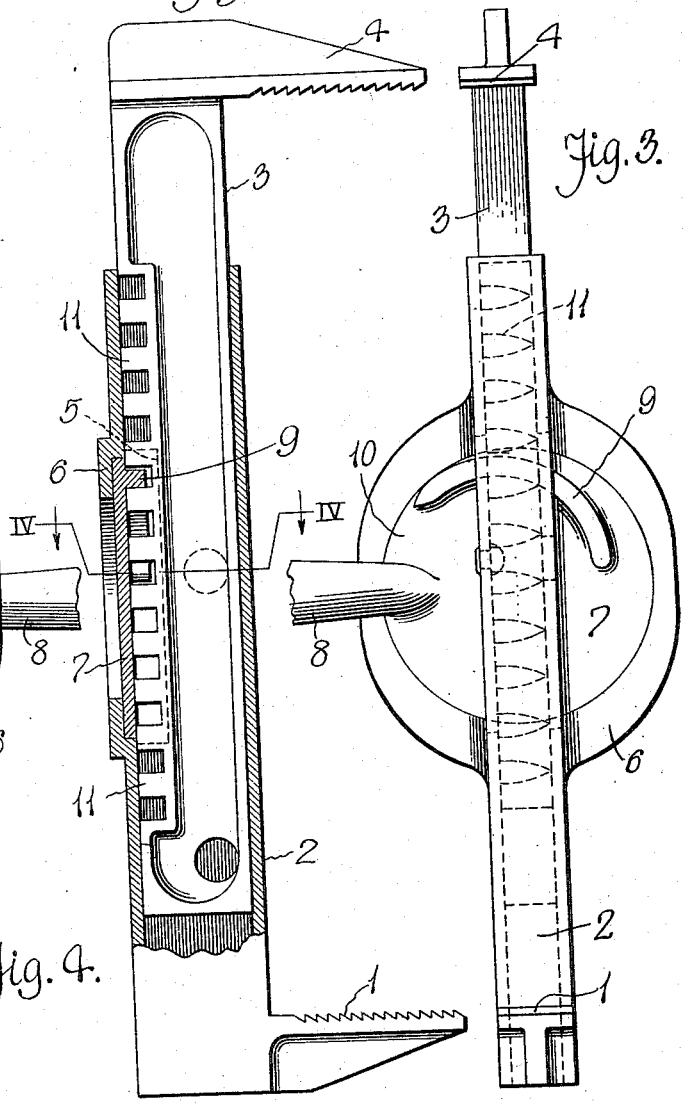
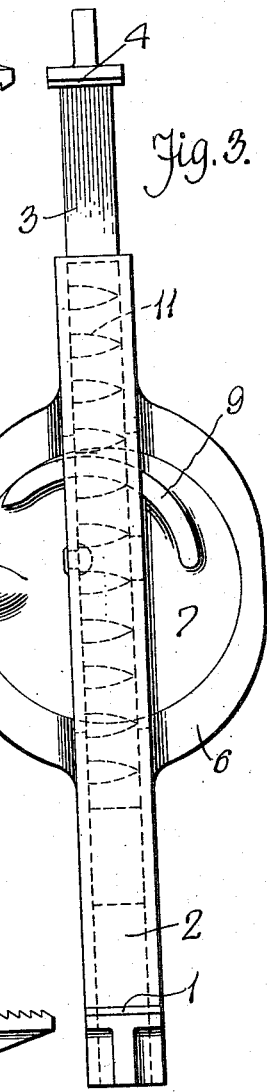
Fig. 4.
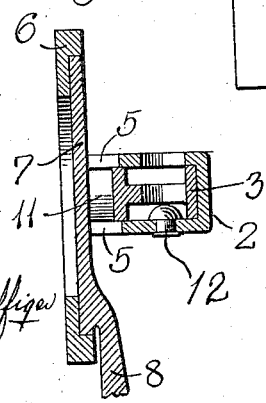
Witness
Chas. W. Stauffiger
Anna M. Dorr
Inventor
Frederick P. Tessmer,
By
Attorneys

UNITED STATES PATENT OFFICE.

FREDERICK P. TESSMER, OF DETROIT, MICHIGAN.

CLAMP.

1,226,029.

Specification of Letters Patent. Patented May 15, 1917.

Application filed February 23, 1916. Serial No. 79,920.

*To all whom it may concern:*

Be it known that I, FREDERICK P. TESSMER, a citizen of the United States of America, residing at Detroit, in the county of Wayne and State of Michigan, have invented certain new and useful Improvements in Clamps, of which the following is a specification, reference being had therein to the accompanying drawings.

In the use of clamps for holding copes and nowels together in foundry work, it is necessary that the parts not only be firmly united, so as to be rolled without shifting, but that also the clamps be so designed as not to be displaced or released during the rolling process, while at the same time it is necessary that the clamps be quickly loosened when it is desired to shake out the mold.

This invention relates to a clamp that is particularly adaptable for a mold or flask and may also be used for other purposes, the parts being so disposed as not to project to any considerable distance beyond the sides of the clamp or the object that is inclosed in the clamp, the levers being so arranged that the clamps do not become readily unlocked. Another advantage gained by the invention is the disposition of the parts so that the operating handles do not extend from the clamp in such direction as to be displaced by persons passing along the floor between the flasks.

The invention consists in the matters hereinafter set forth, and more particularly pointed out in the appended claims.

In the drawings,

Figure 1 is a view, partially in elevation and partially in longitudinal section, of a flask clamp that embodies features of the invention;

Fig. 2 is a view, partially broken away and partially in elevation, taken at right angles to Fig. 1;

Fig. 3 is a view in elevation, partially broken away, of the inside of the face of the clamp; and Fig. 4 is a view in detail taken on or about line IV—IV of Fig. 1.

As herein shown, an outer clamp member has a jaw 1 and a shank 2 that is hollow and forms a guide-way for telescopic engagement with an inner clamp shank 3 on the outer end of which is a jaw 4 arranged to coöperate with the jaw 1. The outer wall and adjacent sides of the outer shank 2 are cut away as indicated by dotted lines 5, between the ends of the shank and the opening is spanned by an annular boss 6 that is suitably designed to withstand longitudinal strain, and is counterbored or rabbeted as a bearing for a circular disk or cam plate 7. The latter is operated by a suitable handle 8 and carries a segmental cam flange 9 on its inner face which is at such an interval from the handle 8 that, when the handle is turned against the walls of the shank 2, sufficient interval as indicated at 10, is left to permit the passage of the inner clamp shank 3. A series of arcuate teeth 11 are formed on the margins of the shank 3 adjacent the cam plate 7, so that when the cam plate is turned with the handle in the position shown in Fig. 3, the segment 9 engages any one of the teeth and forces the clamp together.

If desired, a headed rivet 13 may be inserted in one of the walls of the shank 2 to play in the slot caused by the preferred channel-shaped formation of the shank 3, and thereby prevent accidental withdrawal of the shank.

As a result of this construction, a clamp may be quickly adjusted in position, the wide bearing of the cam disk giving great rigidity while the friction caused by the wide bearing and of the cam segment and tooth lock the clamp in adjusted position. As the operating level is at one side of and within the plane of the outer limits of the clamp when applied to a flask, the handle does not protrude so that a passer-by can hit and displace it. Also, because of its position, the flask may be readily rolled over without causing the clamp to loosen. As the bearing is large, the cam plate is firmly supported and there are no pivot pins or studs to shear off. The clamp is assembled by slipping the parts together and is as readily dismounted. It affords a quick adjustment of the jaws over a wide range and then a clamping adjustment that is very powerful and is not disturbed by movements of the flask.

Obviously, changes in the details of construction may be made without departing from the spirit of my invention and I do not care to limit myself to any particular form or arrangement of parts.

What I claim is:—

1. A clamp comprising a pair of members having coöperating jaws and telescoping shanks one of which is provided with a series of rack teeth and the other of which is provided with a counterbored annular boss, a cam plate journaled in and housed by the boss having a cam segmental flange on the base adjacent the rack teeth for engaging the latter, and a handle for oscillating the plate that lies between the confines of the telescoping shanks.

2. A clamp comprising a pair of members having coöperating jaws and telescoping shanks, one of which is provided with a series of rack teeth and the other of which is formed with an annular boss adjacent the rack teeth, the side walls of the shank being cut away between the boss and the rack teeth, and a cam plate journaled in and housed by the boss and provided with an eccentric projection for engaging the rack teeth and drawing the jaws together, together with means for manipulating the cam plate that lies between the confines of the telescoping portions of the shanks.

3. A clamp comprising a member having a jaw at one end and a transversely disposed hollow shank provided with an annular boss spanning an opening through one wall of the shank, a second member having a shank longitudinally reciprocable in the hollow shank and rack teeth adjacent the annular boss together with a jaw coöperating with the other member's jaw, a cam plate rotatable in the boss by which it is housed and between the latter and the rack teeth, an eccentric segmental projection on the plate for engaging the teeth and forcing the jaws together, and a handle extending from the plate between the confines of the telescoping portions of the shank for oscillating the plate.

4. A clamp comprising a member having a jaw at one end and a hollow shank extending transversely therefrom, the outer wall of said shank being cut away for an interval between the ends thereof, an annular boss spanning the opening and having a counterbored bearing on its inner face adjacent the opening into the interior of the shank, a member having a jaw with a transverse shank extending from one end thereof and sliding into the hollow shank, rack teeth on the inner shank adjacent the bearing boss, a cam plate insertible between the boss and the rack teeth provided with an eccentric segment for engaging between the rack teeth and forcing the jaws together and rotatable in the boss and a lateral extension from the plate for turning the latter that lies between the planes of the inner and outer faces of the telescoping portions of the shanks.

In testimony whereof I affix my signature in presence of two witnesses.

FREDERICK P. TESSMER.

Witnesses:
ANNA M. DORR,
C. R. STICKNEY.